US007925250B2

(12) United States Patent
Redpath

(10) Patent No.: US 7,925,250 B2
(45) Date of Patent: Apr. 12, 2011

(54) REUSE OF A MOBILE DEVICE APPLICATION IN A DESKTOP ENVIRONMENT

(75) Inventor: Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 11/390,529

(22) Filed: Mar. 27, 2006

(65) Prior Publication Data

US 2007/0226327 A1   Sep. 27, 2007

(51) Int. Cl.
*H04M 3/00* (2006.01)
(52) U.S. Cl. ....... 455/420; 455/418; 455/566; 455/90.1; 455/557; 703/23; 703/24; 703/27; 717/138
(58) Field of Classification Search .................. 455/557, 455/418–420, 423–425, 566, 90.1–90.2; 707/100; 709/223, 238; 703/13–14, 20–24, 703/27; 717/118, 138, 168, 178
See application file for complete search history.

(56) References Cited

U.S. PATENT DOCUMENTS

| 7,363,035 B2* | 4/2008 | Reilly ........................ 455/432.3 |
| 7,386,855 B2* | 6/2008 | Song et al. .................... 719/310 |
| 2002/0148896 A1 | 10/2002 | Persky et al. |
| 2002/0178402 A1 | 11/2002 | Tsai |
| 2003/0103088 A1 | 6/2003 | Dresti et al. |
| 2004/0204964 A1 | 10/2004 | Moore et al. |
| 2006/0252435 A1* | 11/2006 | Henderson et al. .......... 455/466 |
| 2007/0073858 A1* | 3/2007 | Lakshmi Narayanan et al. .............................. 709/223 |
| 2007/0207819 A1* | 9/2007 | Redpath ........................ 455/466 |

* cited by examiner

*Primary Examiner* — Tuan A Tran
(74) *Attorney, Agent, or Firm* — A. Bruce Clay

(57) ABSTRACT

A method, system, and program product for providing for reuse of a mobile device application in a desktop environment is disclosed. The method includes obtaining an application that is configured for running on a mobile device, and then running the mobile device application on a desktop. A method for deploying an application that includes providing a computer infrastructure that is operable to run the application on a desktop and provide user preferences for the application on the desktop is also disclosed.

16 Claims, 7 Drawing Sheets

REUSE OF A MOBILE DEVICE APPLICATION IN A DESKTOP ENVIRONMENT

BACKGROUND OF THE INVENTION

1. Field of the Invention

The present invention relates generally to improvements in a data processing system environment wherein an application reuse is contemplated for alternative device types. More specifically, the present invention provides a method, system, and computer program product for reuse of a mobile device application in a desktop environment.

2. Background Art

Mobile device applications which are physically characteristic to mobile information devices provide a means for enterprise delivery of information. Enterprises invest in the creation of these applications to provide to the mobile workforce a means to extend business. Prior art for business operations is typically to have an application on the mobile device for mobile employees and additional, different and separate applications on office desktop computers, laptops, and the like. The enterprise is required to apply resources (i.e., financial, human, etc.) to achieve quality in both areas of operations for these multiple applications.

Therefore there is an opportunity to achieve more value from the mobile workforce applications with seamless operation on the office desktop computer or laptop for cost effective operation of the business.

The overall concept is to provide a solution which clearly adds more value for the investment of the mobile device application in an enterprise that employs both mobile devices and desktop devices.

In view of the foregoing, there exists a need for a method, system, and program product for further leveraging the use of mobile device applications.

SUMMARY OF THE INVENTION

In general, the present invention provides a method, system, and program product for providing for reuse of a mobile device application in a desktop environment. The method includes obtaining an application that is configured for running on a mobile device, and then running the mobile device application on a desktop. A method for deploying an application that includes providing a computer infrastructure that is operable to run the application on a desktop and provide user preferences for the application on the desktop is also disclosed.

A first aspect of the present invention provides a method of providing reuse of a mobile device application in a desktop environment, comprising: obtaining an application configured for running on a mobile device; and running the mobile device application on a desktop.

A second aspect of the present invention provides a system for providing reuse of a mobile device application in a desktop environment, comprising: a system for obtaining an application configured for running on a mobile device; and a system for running the mobile device application on a desktop.

A third aspect of the present invention provides a program product stored on a computer readable medium for providing reuse of a mobile device application in a desktop environment, the computer readable medium comprising program code for performing the steps of: running a mobile device application on a desktop, wherein the mobile device application is configured for running on a mobile device; and providing at least one user preference on the desktop for the mobile device application.

A fourth aspect of the present invention is directed to a method for deploying an application for providing reuse of a mobile device application in a desktop environment, comprising: providing a computer infrastructure being operable to: run an application on a desktop, wherein the application is configured for running on a mobile device; and provide at least one user preference on the desktop for the application.

A fifth aspect of the present invention provides computer software embodied in a propagated signal for providing reuse of a mobile device application in a desktop environment, the computer software comprising instructions to cause a computer system to perform the following functions: obtaining an application configured for running on a mobile device; and running the mobile device application on a desktop.

Therefore, the present invention provides a method, system, and a computer program product for reuse of a mobile device application in a desktop environment.

BRIEF DESCRIPTION OF THE DRAWINGS

These and other features of this invention will be more readily understood from the following detailed description of the various aspects of the invention taken in conjunction with the accompanying drawings in which.

Figure 1:
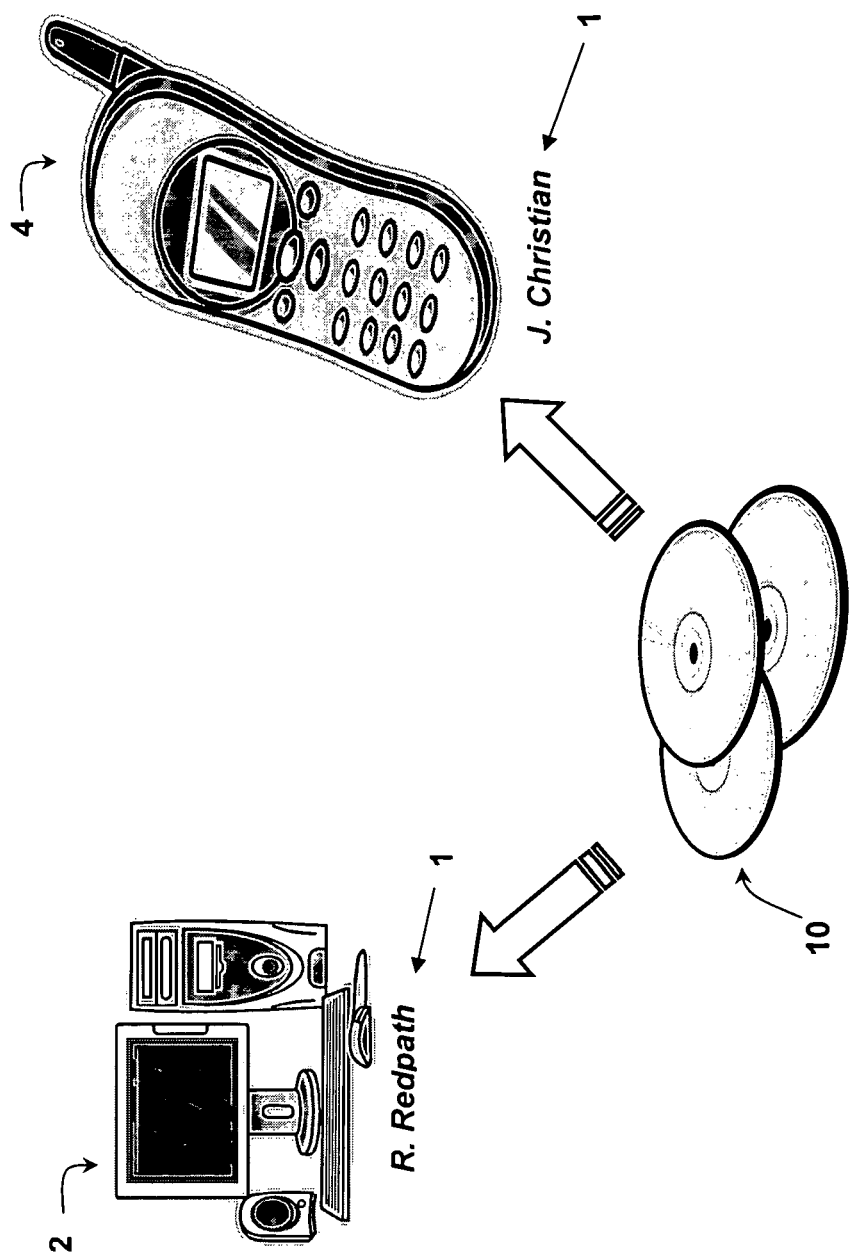
FIG. 1 depicts a pictorial conceptualization of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As indicated above, the present invention provides a method, system and program product for providing for reuse of a mobile device application in a desktop environment.

The present invention provides a method for an emulator that provides for mobile device (e.g., mobile phone) application reuse on a non-mobile device (e.g., desktop) with a prerogative for providing additional functions and/or functionalities that are available on the new device (i.e., non-mobile device) in a seamless manner.

A pictorial conceptualization of an embodiment of the present invention is depicted in FIG. 1 includes a desktop device 2 and a mobile device 4 and at least one application 10 configured for the mobile device 4. Users 1 (e.g., "R. Redpath" 1, "J. Christian" 1) are able to use the desktop device 2 and mobile device 4, which includes using and running various applications configured for use thereon.

Desktop device 2 and mobile device 4 are used herein not as terms of limitation but of general description and are meant to connote that desktop device 2 may include various personal computer-type devices including a stationary personal computer (PC), a lap-top PC, a tablet, and other similar device now known or later developed. That is desktop device 2 includes devices that, on whole, may have larger display areas and/or more keys and keystroke functionality than the mobile device 4. Similarly, mobile device 4, as used herein, is not limited to only mobile phone and cell phones, but includes devices such as a personal digital assistant (PDA), palm top computer, and similar devices now known or later developed. Mobile device 4 includes devices that, on whole, may have a smaller display area and/or less keys and keystroke functionality than the desktop device 2. Thus, as used herein, conceivably the term mobile device 4 and desktop device 2 may, in some embodiments, include a situation where both devices, in the view of a layperson, are from the same generic category or group of communication devices. The difference being that the mobile device 4 has fewer attributes than the desktop device 2.

Alternatively, the use of terms a first telecommunication device 2 and a second telecommunication device 4 were avoided only for illustrative purposes in that for the most common situation of the present invention is wherein a mobile device application 10 configured for use on a common cell phone (i.e., mobile device 4), while the mobile device application 10 is reused at a desktop personal computer (PC) (i.e., desktop device 2).

Figure 2:
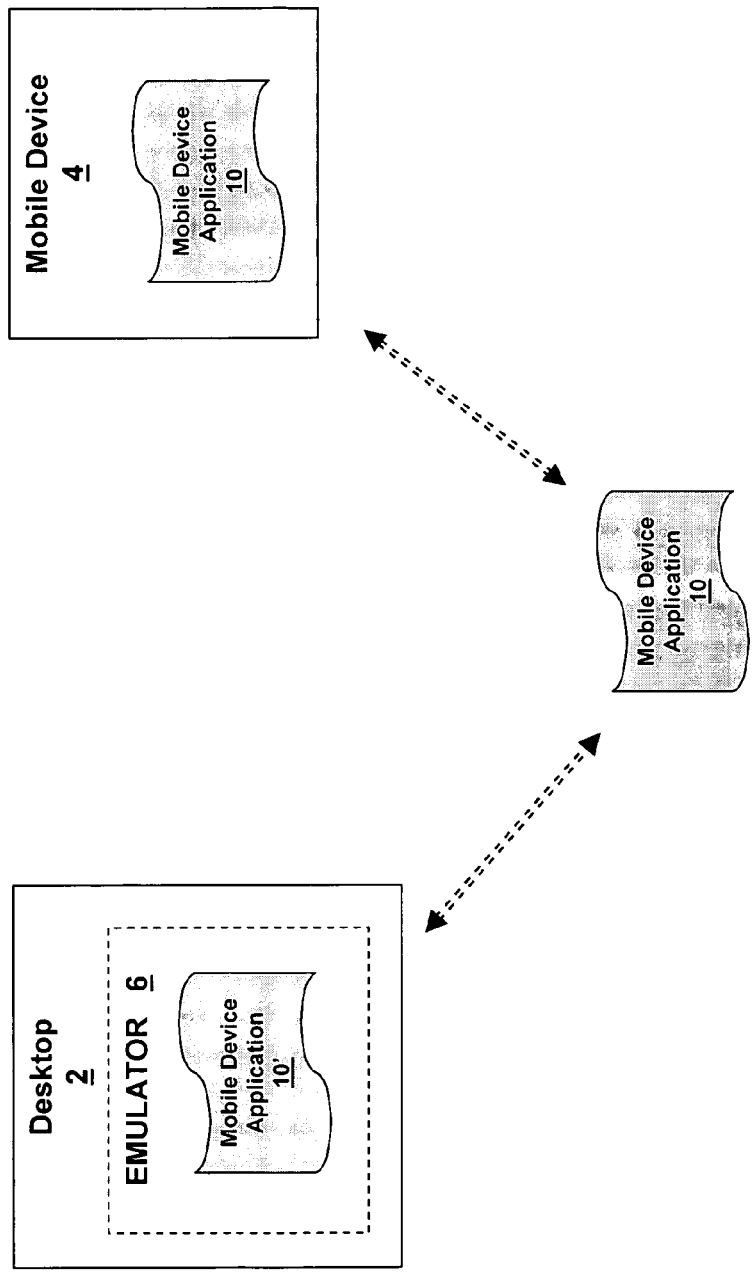
FIG. 2 depicts a schematic diagram of the use and reuse of a mobile device application in accordance with an embodiment of the present invention.

As the schematic representation in FIG. 2 more clearly shows, a mobile device application 10 typically is created to run on the mobile device 4. The same mobile device application 10 is reused, as denoted by 10', on a desktop device 2 under embodiments of the present invention. The mobile device application 10' may be run on an emulator 6 on the desktop device 2.

Various mobile device applications 10 may be run on the emulator 6 of the desktop device 2. Typically, the mobile device applications 10 are MIDlets. A MIDlet is an application, typically written in Java 2 Platform, Micro Edition version (J2ME), intended for use by a mobile device 4 that, often, complies with both Connected, Limited Device Configuration (CLDC) and Mobile Information Device Profile (MIDP). Java and all Java-based trademarks are trademarks of Sun Microsystems, Inc. in the United States, other countries, or both.

The emulator 6 may be a MIDlet emulator such an internal Java virtual machine (JVM). JVM is an interpreter that is an implementation of the Java virtual machine specification that converts Java bytecode for a hardware platform into machine language and executes it.

In an embodiment of the present invention, an IBM® J9 MIDlet emulator is the emulator 6 employed to run the mobile device application 10 (e.g., MIDlet) on the desktop device 2. Thus, the mobile device application 10 that was originated for the mobile device 4 may now seamlessly be used on the desktop device 2. As a result, the desktop device 2 can now be the "central hub" for running many mobile device applications 10 (e.g., MIDlet applications).

Figure 3:
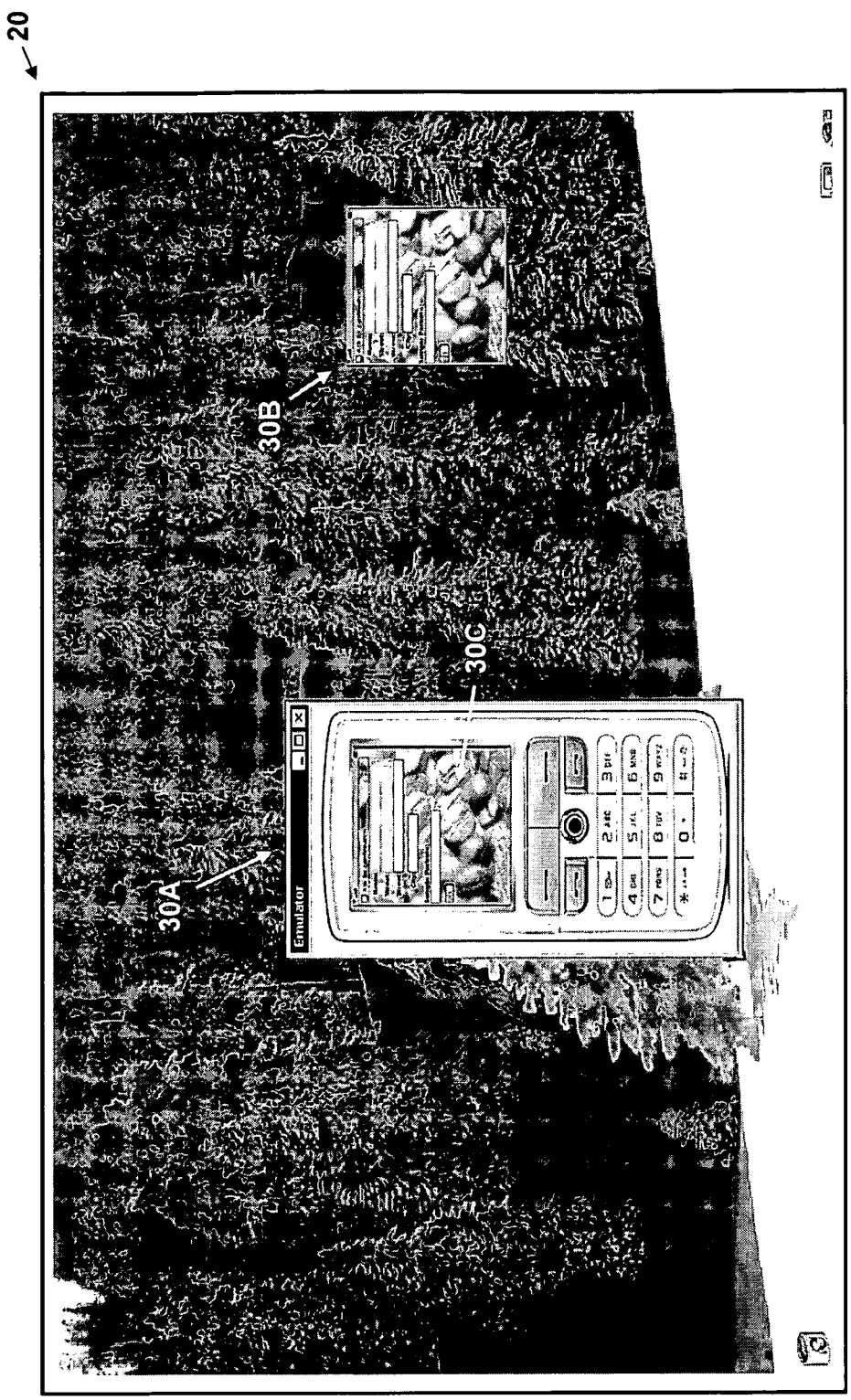
FIG. 3 depicts a view of a desktop user interface using a plurality of mobile device applications in accordance with an embodiment of the present invention.
Figure 4:
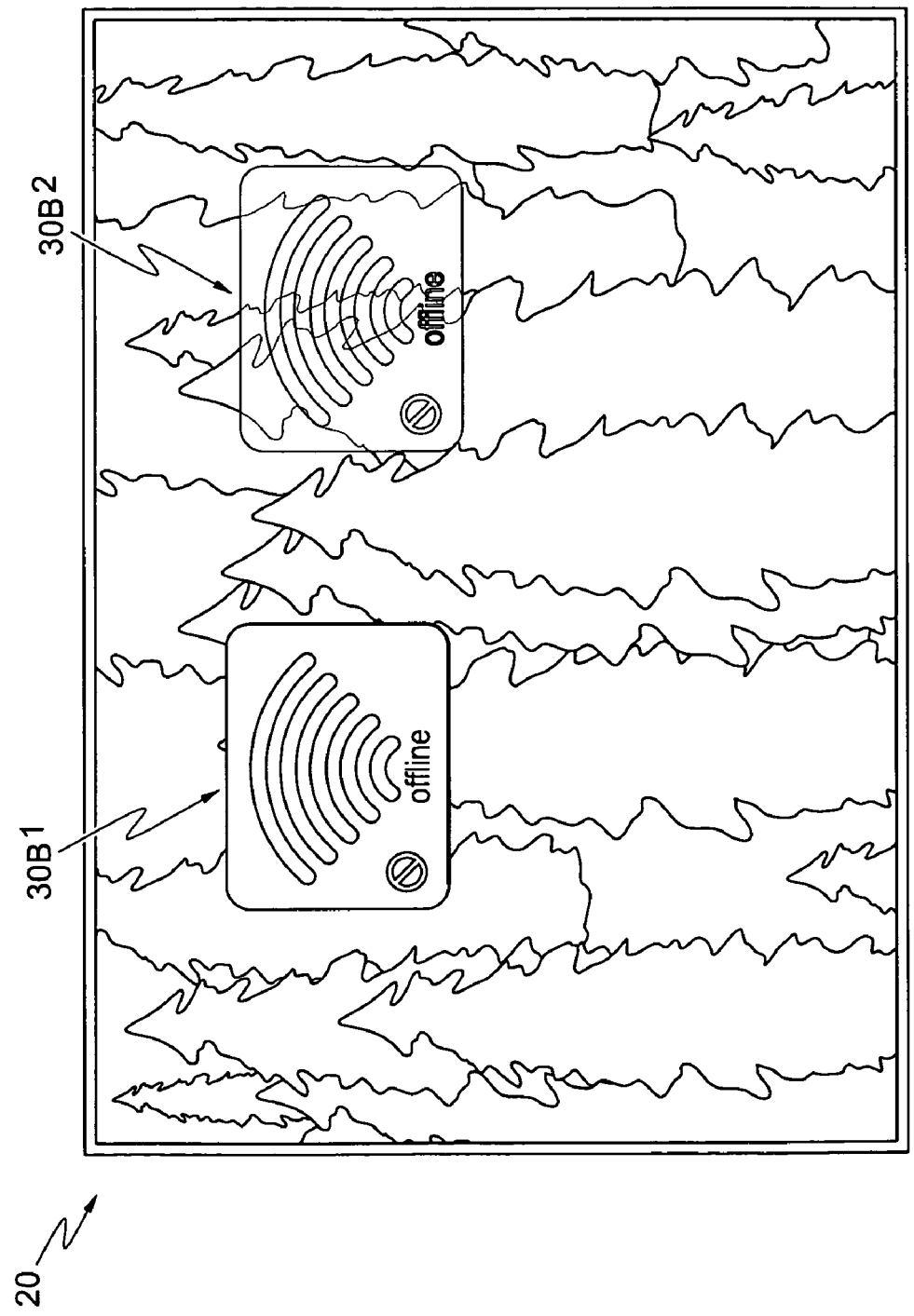
FIG. 4 depicts a view of a desktop user interface using a plurality of mobile device applications, in accordance with another embodiment of the present invention.
Figure 5:
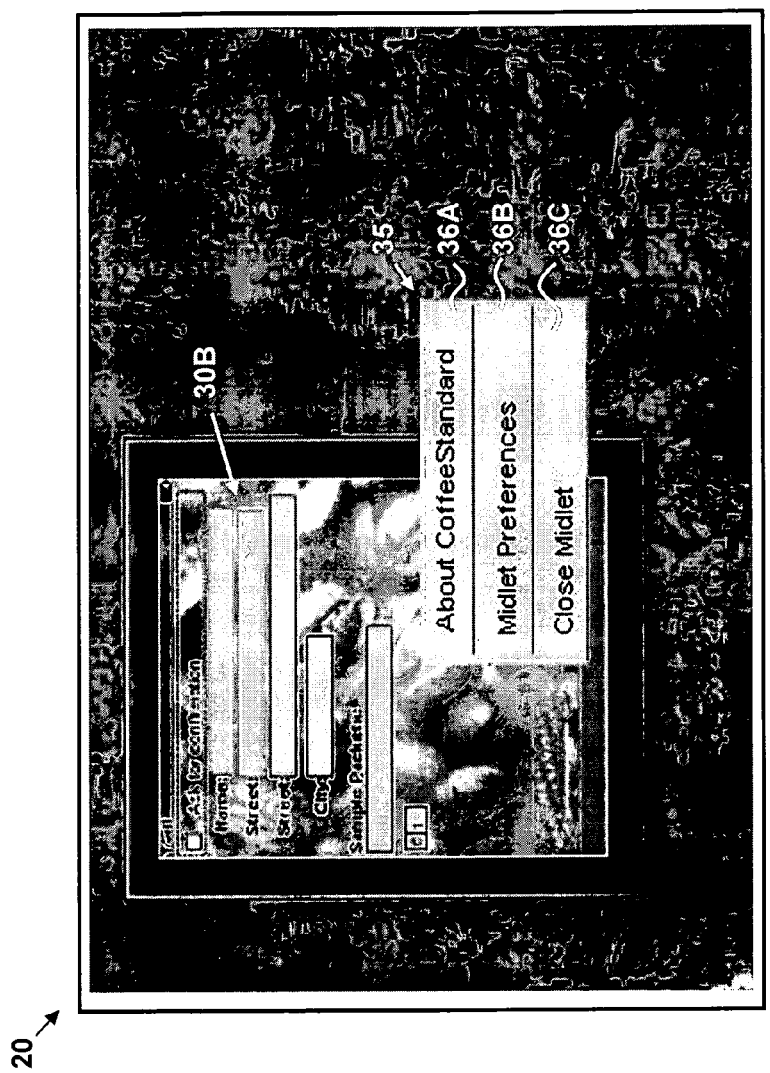
FIG. 5 depicts a view of a desktop user interface using a mobile device application, including a pop-up menu, in accordance with embodiments of the present invention.

FIGS. 3 through 5 show various user interfaces 20 (e.g., desktop display) on a desktop device 2 employing the present invention. For example, FIG. 3 depicts a user interface 20 for a desktop device 2 that includes a display 30A (e.g., emulator application) and mobile device application display 30B, in accordance with the present invention. Display 30A is, for example, an emulator application for developing MIDlets on a user interface 20 of a desktop device 2. This emulator application presents itself as a phone with a mobile phone display area 30C. Conversely, by applying aspects of the present invention, the mobile device application 30B is now seamlessly integrated as part of the desktop display 20. That is mobile device application 30B is the display area 30C used by the phone device to present phone applications that has been transported into the desktop display 20 in a seamless manner.

Various user preferences may be available, under the present invention, upon running of the mobile device application 10 on the desktop device 2. User preferences are adjustable and may include one, or a combination of the following: opacity, scaling, font selection, framing, draggable for positioning, popup menus, background selection of MIDlet contents, sounds options when data is received, and the like. For example, as the user interface 20 at a desktop device 2 in FIG. 4 shows, the opacity of the mobile device application display 30B (e.g. $30B^1$, $30B^2$) may be user adjustable. The first mobile device application display $30B^1$ (i.e., on left) has a 'default' opacity, while the second mobile device application display $30B^2$ (i.e., on right) has an opacity set at 25%.

Figure 6:
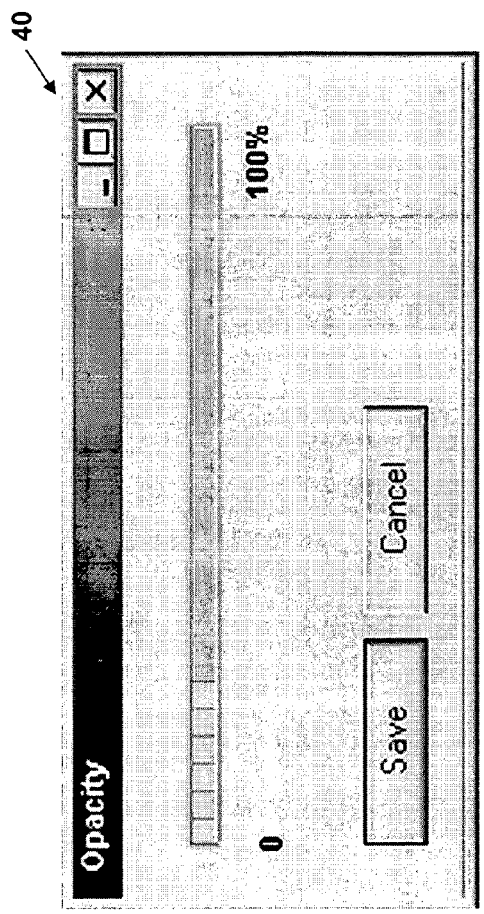
FIG. 6 depicts a view of a customizing frame for adjusting attributes of the desktop user interface, in accordance with embodiments of the present invention.

FIG. 5 shows one embodiment of how various preferences in mobile device application display 30 may be adjusted by the user. For example, the user might "right-click" their mouse, thereby bringing up on the desktop 2 interface 20 a window 35 (e.g., pop up menu) that offers a plurality of options including ways to set the frame and opacity of the mobile device application display 30. For example, the window 35 may include a plurality of options or selections 36 (e.g., "About" 36A, "MIDlet preferences" 36B, "Close MIDlet" 36C). By selecting, for example, "MIDlet preferences" 36B a frame 40 (see e.g., FIG. 6) may appear that offers MIDlet preferences including, for example, opacity of the mobile device application display 30.

The present invention ultimately provides a method, system, and computer program product for providing for reuse of a mobile device application in a desktop environment.

Figure 7:
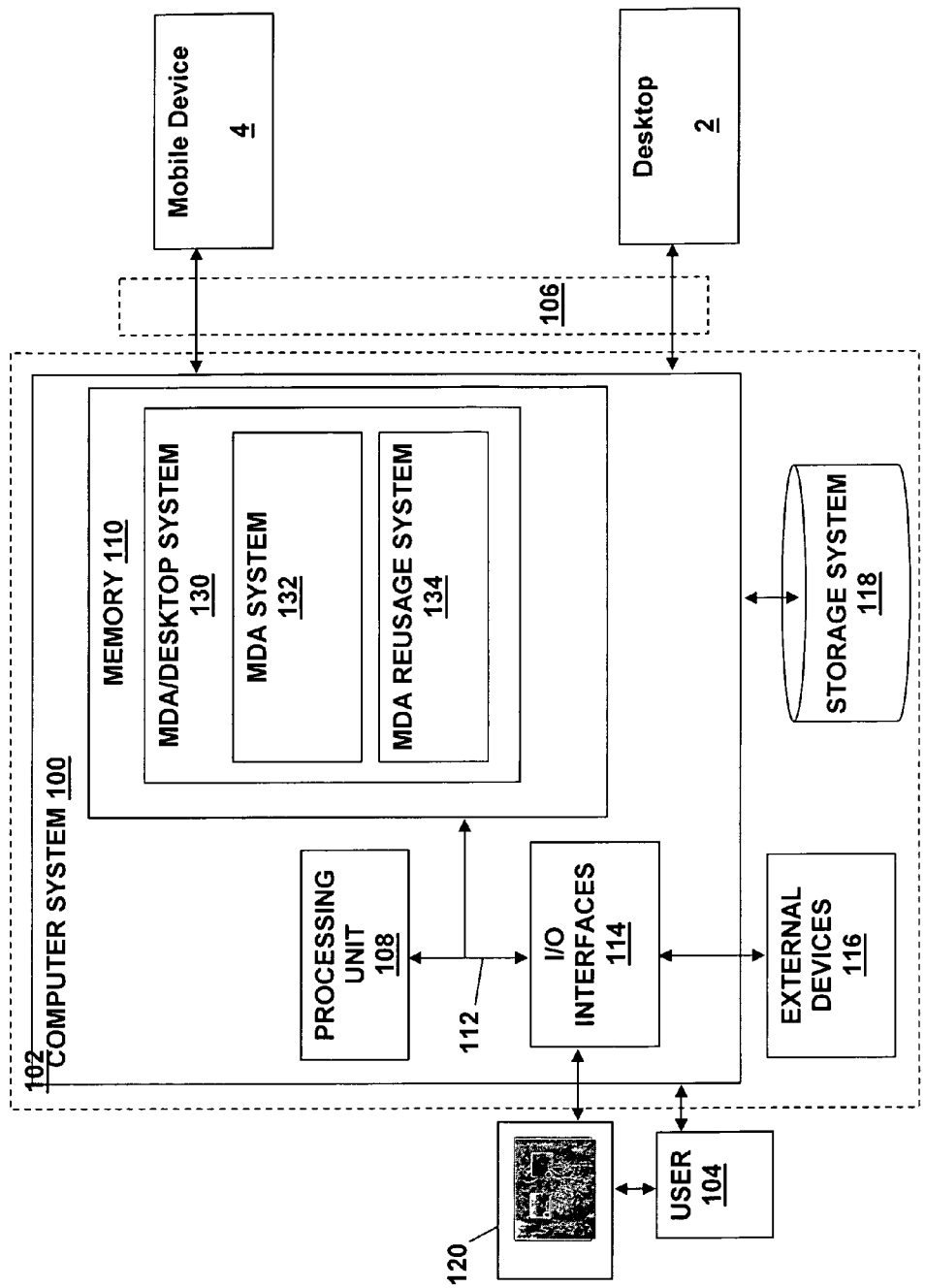
FIG. 7 depicts a computerized system for providing for reuse of a mobile device application in a desktop environment, in accordance with an embodiment of the present invention.

A computer system 100 for providing for reuse of a mobile device application in a desktop environment in accordance with an embodiment of the present invention is depicted in FIG. 7. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for providing for reuse of a mobile device application in a desktop environment, in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as Mobile Device Application and Desktop Device (MDA/Desktop) System 130, which is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 7 can be included in computer system 100. However, if computer system 100 comprises a handheld device or the like, it is understood that one or more external devices/resources 116 (e.g., display 120) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is an Mobile Device Application and Desktop Device (MDA/Desktop) System 130 for providing for reuse of a mobile device application in a desktop environment, in accordance with embodiment(s) of the present invention. The MDA/Desktop System 130 generally includes a Mobile Device Application (MDA) System 132 for a plurality of mobile device 4 applications 10, as described above. The MDA/Desktop System 130 generally includes a MDA Reusage System 134 for reusing the mobile device 4 applications 10 for desktops 2, as described above.

The present invention can be offered as a business method on a subscription or fee basis. For example, one or more components of the present invention can be created, maintained, supported, and/or deployed by a service provider that offers the functions described herein for customers. That is, a service provider can be used to provide for reuse of a mobile device application in a desktop environment, as described above.

It should also be understood that the present invention can be realized in hardware, software, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method of providing reuse of a mobile device application in a desktop environment, comprising:
   obtaining a mobile device application configured for running on a mobile device comprising a Mobile Information Device Applet (MIDlet) configured for a display area associated with the mobile device; and
   running the mobile device application on a desktop, wherein the running comprises running the mobile device application on an emulator, that visually and functionally emulates the display area of the mobile device in a window on the desktop.

2. The method of claim 1, wherein the running includes providing a plurality of user preferences on the desktop.

3. The method of claim 2, wherein at least one of the plurality of user preferences is selected from the group consisting of opacity, scaling, font selection, framing, draggable for positioning, popup menus, background selection of MIDlet contents, sounds options when data is received, and combinations thereof.

4. The method of claim 1, wherein the emulator is a java virtual machine (JVM).

5. The method of claim 1, wherein the running further comprises displaying a user interface.

6. The method of claim 1, wherein the mobile device is selected from the group consisting of a mobile phone, a cell phone, a personal digital assistant (PDA), and a palm top computer.

7. The method of claim 1, wherein the desktop is selected from the group consisting of a personal computer (PC), a lap-top PC, and a tablet.

8. A system for providing reuse of a mobile device application in a desktop environment, comprising:
   a system for obtaining a mobile device application configured for running on a mobile device comprising a Mobile Information Device Applet (MIDlet) configured for a display area associated with the mobile device; and
   a system for running the mobile device application on a desktop, wherein the system for running comprises a system for running the mobile device application on an emulator that visually and functionally emulates the display area of the mobile device in a window on the desktop.

9. The system of claim 8, wherein the system for running includes a system for providing a plurality of user preferences on the desktop.

10. The system of claim 9, wherein at least one of the plurality of user preferences is selected from the group consisting of: opacity, scaling, font selection, framing, draggable for positioning, popup menus, background selection of MIDlet contents, sounds options when data is received, and combinations thereof.

11. The system of claim 8, wherein the emulator is a java virtual machine (JVM).

12. The system of claim 8, wherein the system for running further comprises a system for displaying a user interface.

13. The system of claim 8, wherein the mobile device is selected from the group consisting of a mobile phone, a cell phone, a personal digital assistant (PDA), and a palm top computer.

14. The system of claim 8, wherein the desktop is selected from the group consisting of a personal computer (PC), a lap-top PC, and a tablet.

15. A computer program product for providing reuse of a mobile device application in a desktop environment, the computer program product comprising a non-transitory computer readable storage medium having computer-readable program code embodied therewith, the computer readable program code, comprising:
   computer readable program code configured to obtain a mobile device application configured for running on a mobile device comprising a Mobile Information Device Applet (MIDlet) configured for a display area associated with the mobile device;
   computer readable program code configured to run a mobile device application on a desktop, wherein the mobile device application is configured for running on a mobile device, running the mobile device application on a desktop, wherein the running comprises running the mobile device application on an emulator that visually and functionally emulates the display area of the mobile device in a window on the desktop; and
   computer readable program code configured to provide at least one user preference on the desktop for the mobile device application.

16. A method for deploying an application for providing reuse of a mobile device application in a desktop environment, comprising:
   providing a computer infrastructure being operable to:
   obtain a mobile device application configured for running on a mobile device comprising a Mobile Information Device Applet (MIDlet) configured for a display area associated with the mobile device;
   run an application on a desktop, wherein the application is configured for running on a mobile device, wherein the run comprises running the mobile device application on an emulator that visually and functionally emulates the display area of the mobile device in a window on the desktop; and
   provide at least one user preference on the desktop for the application.

* * * * *